April 14, 1953     W. G. TAYLOR     2,634,510
METHOD FOR DRYING TENUOUS FILMS
Filed Sept. 13, 1950
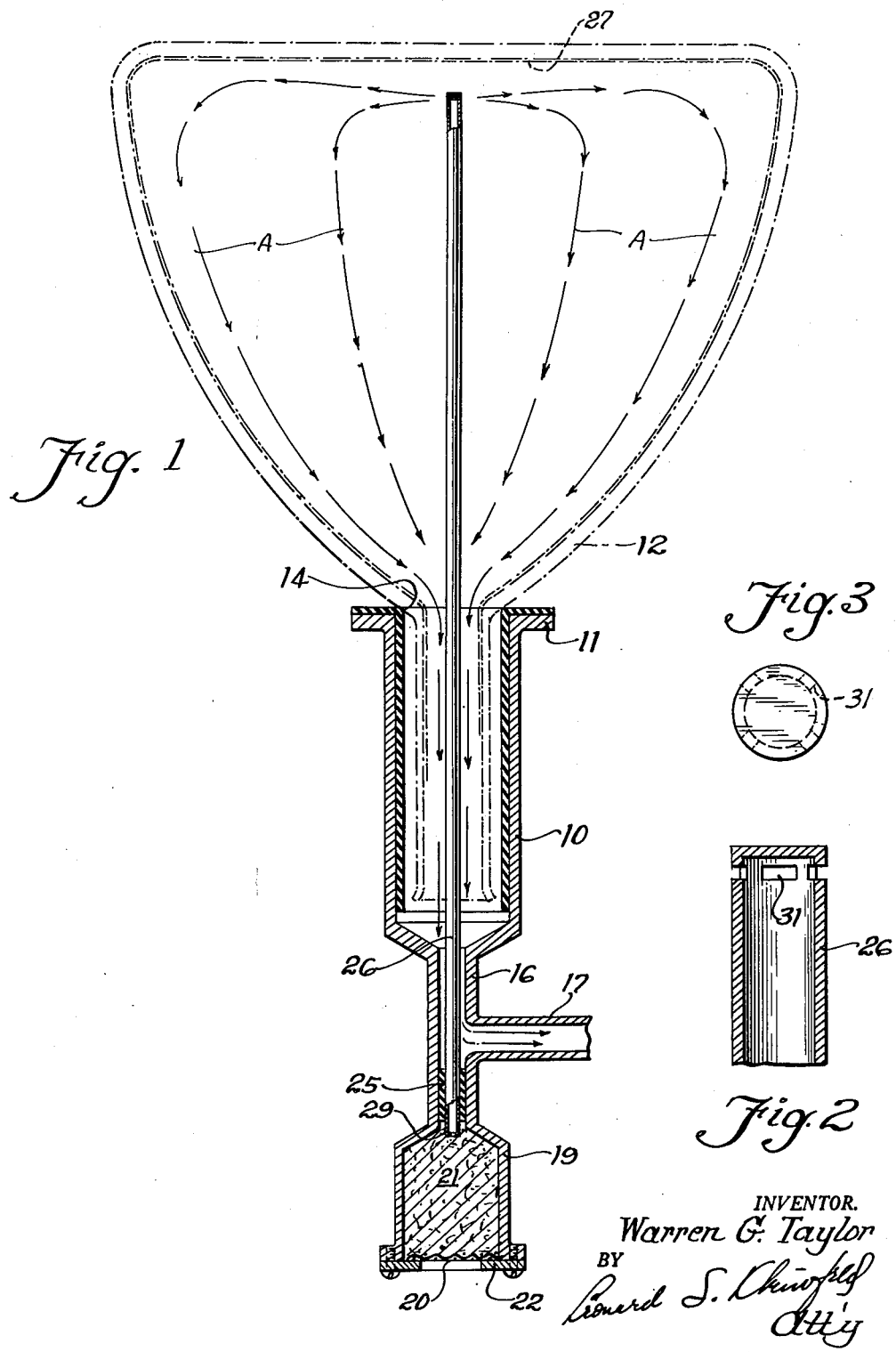
INVENTOR.
Warren G. Taylor
BY Patented Apr. 14, 1953

2,634,510

UNITED STATES PATENT OFFICE 2,634,510

METHOD FOR DRYING TENUOUS FILMS

Warren G. Taylor, Chicago, Ill., assignor to American Television, Inc., Chicago, Ill.

Application September 13, 1950, Serial No. 184,588

1 Claim. (Cl. 34—15)

This invention relates to a method for drying moisture-containing tenuous films. In particular it has reference to a method for drying the freshly prepared screen of a cathode ray tube or similar device.

Cathode ray tubes, as for example, those employed for projecting a televised image, are provided on the inside front face with a screen for impingement by the electron beam, the screen fluorescing under bombardment to provide the desired image. Such screens comprise principally a binder and a fluorescent salt carried therein, the binder possessing such properties that when wet it will adhere to the glass envelope provided there is no shock in handling. In its wet stage, i. e. prior to being dried in accordance with the process herein disclosed, the film may be described as "glutinous" in that it is sufficiently thin and adherent to cling to the interior face of the picture end of the tube against the force of gravity, and particularly when the tube is positioned with that face horizontal. At the same time, however, the film may be regarded as tenuous in that it will not withstand the effects of vibration or air currents of any substantial magnitude. After being dried the screen material becomes bonded to the glass and will withstand all of the abuse to which a cathode ray tube may be ordinarily subjected.

However following the so-called "settling out" of the screen material from the "cushion" and as will be understood by those skilled in the art, it becomes necessary to decant the cushion and to dry the screen in an accelerated manner. Otherwise even the mildest type of shock will cause the screen to slide upon or become detached from the glass, and the tube must be rescreened. It will be understood by those skilled in this art that until the screen material has been rendered devoid of its moisture content, the picture face of the tube must be held horizontally and with the neck down. However, since such face is slightly concave, the tube may not be permitted to stand too long after the screen has been formed with the inner face of the tube up as the semi-liquid screen material will tend to flow downwardly to form a "puddle." But by reversing the tube so that the front face is up, the situation is reversed and the puddle may not form. Nor is there any tendency, while the tube is in this position, for the marginal portions of the screen—in the absence of any disturbing influence—to separate from the central portion.

Due to the tenuous nature of the screen film prior to complete drying thereof an air blast or current cannot be used for fear of injury to the screen. Moreover any particles of foreign matter swept into the tube during drying are embedded in the screen to cause defects therein. Accordingly the tube becomes a reject. By maintaining the tube with its neck down following decanting of the cushion the likelihood of foreign matter entering the envelope is materially minimized. By the same token the screen meanwhile is subject to gravity and may slide or become detached. For these reasons it is imperative that drying of the screen be accomplished as soon as possible following decanting, and under conditions least calculated to damage the screen.

Heretofore this accelerated drying action has been attempted by application of direct vacuum. However the method has never been acceptable because frequently the screen, or at least portions thereof were detached completely from the glass when a vacuum calculated to yield fast production was employed, and a safe rate of exhaustion has proved wastefully slow.

My invention has for its principal objects the provision of a method for drying such screens and of a preferred form of apparatus for exercising such method.

Another object is the provision of apparatus which is adapted to production line methods as contrasted with a laboratory arrangement.

A further object is the provision of apparatus which is capable of accommodating tubes of various sizes and types with little or no alteration in its parts.

Generally regarded the invention method contemplates the withdrawal of the moisture retained in the screen by means of a vacuum, and the simultaneous bleeding in to the tube envelope of air at atmospheric pressure, the rate of evacuation being somewhat greater than the rate of flow of atmospheric air. In another aspect the invention comprises an arrangement of apparatus calculated to scavenge the interior of the tube of foreign solid matter by directing air currents in a predetermined pattern. Moreover by interposing a filter in the path of the bleeder air introduction of additional foreign particles is successfully avoided.

In the drawing which depicts a preferred form of apparatus in accordance with my invention:

Fig. 1 shows a cross sectional view on the longitudinal axis;

Fig. 2 is a cross-sectional detail of the discharge end of the bleeder nozzle; and Fig. 3 is a top plan view of the showing of Fig. 2.

Referring first to Fig. 1, the apparatus comprises a conduit or receptacle 10 of cylindrical form including a flanged open upper end 11 to define a rest for the cathode ray tube 12. To protect the glass envelope against fracture, the flange and inner surface of the conduit are lined with sponge rubber or equivalent, the portion thereof adjacent the corner 14 serving to seal the exterior of the tube with respect to the space within the conduit. A circular seal is equally adaptable to both round and rectangular tubes since in the latter type the transition from the cylindrical neck to the rectangular body is itself circular at the sealing line 14.

Conduit 10 is in fluid communication with a pipe section 16 from which a side outlet 17 is branched. Outlet 17 is connected to the intake of a vacuum pump (not shown). Forming a continuation of the section 16 is a bell-like housing 19 for retaining a mass of filter material 21, there being a piece of wire mesh 20 and ring 22 secured to the housing to form a lower support for the filter pad.

Carried in a rubber or other suitable bushing 25 is the bleeder nozzle or tube 26, the respective fits being such as to provide substantially air-tight joints combined with rigid support for the nozzle. However it is preferred that the fit also be such that the nozzle may be replaced by one of different length to accommodate tubes of different length, it being noted that the nozzle preferably terminates just beyond the screen 27.

At its lower end the nozzle is provided with an aperture 29 so proportioned as to admit air at a predetermined rate, and as will be explained. The upper end of the nozzle opens through a plurality of slits 31 (Figs. 2 and 3) to break up and distribute the issuing air into a fan-shaped zone of relatively low velocity to avoid impact or abrasive damage to the screen material which would otherwise occur at higher velocities. If desired other modes of exit end may be employed for the nozzle to yield the same effect, e. g. a mushroom-shaped shield spaced away from the open end of the nozzle tube.

In operation, the tube carrying the still wet screen 27 is carefully carried from the decanting rack and placed neck down upon the seal 14, as shown. The vacuum pump is started or a cock provided on the outlet 17 is opened. At this juncture it will be clear that the apparatus shown may be used in multiple on a suitably extended work table, and that all of the outlets 17 may be connected to a manifold leading to the pump. Then, by means of individual cocks one or more of the apparatus units may be employed selectively at will.

Upon creation of a vacuum within the tube envelope moisture is extracted therefrom to dry the screen. However to set up a circulation within the tube to avoid the disastrous effects of straight-forward vacuum drying heretofore noted, air at atmospheric pressure is simultaneously admitted through the nozzle 26. The circulation within the tube takes a path diagrammatically indicated by the arrows A, the air fanning out across the rear of the screen and then flowing down the body of the tube.

By proportioning the rate of flow of bleeder air to the rate of evacuation in such manner that the bleed air issues at a relatively low velocity drying of the screen progresses at a rapid rate, and in a manner without deleterious effect on the tenuous screen film. I have found that for screens normally employed in television receiving tubes, and formed by presently accepted commercial processes a net vacuum as measured at the outlet 17 of 21" to 24" of mercury yields optimum results. It has been found that by the use of my apparatus and method the screen is dried from the outer edges toward the center, which is a desideratum found to accomplish drying in a most uniform manner.

With heretofore used methods of straight-forward vacuum drying the screen, of say a 16" television picture tube, has consumed from six to eight minutes. My method and apparatus accomplishes the same result in approximately one minute. Moreover under such prior practice sudden opening of the cock to the vacuum pump has often resulted in pulling the screen away from the glass.

By employing the method of the invention which accelerates the drying rate to a material degree another important benefit is realized. For example a screen comprising potassium silicate together with phosphoric acid as the gelatinous agent will, under slow drying, frequently develop a yellowish zone in the center of the screen. When using the invention process no change has been detected in the color of such screens which is attributable to the drying phase.

The circulation path resulting from practice of the invention has been found particularly efficacious in scavenging the tube of particles of foreign matter, the current sweeping along the sides of the tube to dislodge any particles lodged thereon. By reason of filter 21 entry of foreign matter with the bleed air is successfully combated.

Not only is the invention method and apparatus ideally adapted to drying of the screen, but is equally useful for drying the inner "Aquadag" coating used as an electrode over the inner face of the side wall and neck of the tube. "Aquadag" is a trade-mark of Acheson Colloids Corp. of Port Huron, Michigan, and refers to their commercial suspension of colloidal graphite in water.

Alternatively I may arrange to supply heated air through the nozzle 26 further to accelerate the drying process, or I may arrange to heat the tube 12 internally or externally for the same purpose. Additionally, and for the same reason, I may provide means for dehumidifying the air entering the nozzle, e. g. a container of a desiccating agent in series with the filter 21.

While I have shown particular embodiments of my invention, it will be understood, of course, that I do not wish to be limited thereto since many modifications may be made, and I therefore contemplate by the appended claim to cover any such modifications as fall within the true spirit and scope of my invention.

Having thus described my invention, what I claim and desire to secure by Letters Patent is:

The method of drying a moisture-containing tenuous, glutinous film adherent to the interior surface of the substantially horizontally-positioned image end of a cathode-ray tube having an open-ended neck which comprises the steps of withdrawing air from the vessel through the neck at a predetermined rate so selected as to avoid disrupting the film, simultaneously supplying air to the vessel at another predetermined and lower rate through a tube positioned within the neck and having a closed end thereof closely adjacent the film and peripherally-distributed, substantially horizontally-extended orifices in the wall of said tube and adjoining said end, the rate of emission through the orifices and the area of the orifices being so selected as to deliver the air in a thin sheet substantially parallel to the film and with a velocity such that injury to the film is avoided.

WARREN G. TAYLOR.

References Cited in the file of this patent

UNITED STATES PATENTS

| Number | Name | Date |
|---|---|---|
| 560,561 | Zappert | May 19, 1806 |
| 1,348,757 | Spencer | Aug. 3, 1920 |
| 1,512,909 | Dohr | Oct. 28, 1924 |
| 2,063,350 | Shoemaker | Dec. 8, 1936 |
| 2,077,378 | Deren | Apr. 20, 1937 |
| 2,285,261 | Ellis | June 2, 1942 |
| 2,391,573 | Herzog | Dec. 25, 1945 |
| 2,444,572 | Leet et al. | July 6, 1948 |
| 2,519,728 | Alexander | Aug. 22, 1950 |
| 2,537,416 | Long | Jan. 9, 1951 |

FOREIGN PATENTS

| Number | Country | Date |
|---|---|---|
| 26,075 | Great Britain | A. D. 1896 |